April 9, 1963   SHUNYA SUZUKI   3,084,660
METERS AND LIKE INSTRUMENTS WITH VARIABLE SCALES
Filed Jan. 6, 1959   2 Sheets-Sheet 1
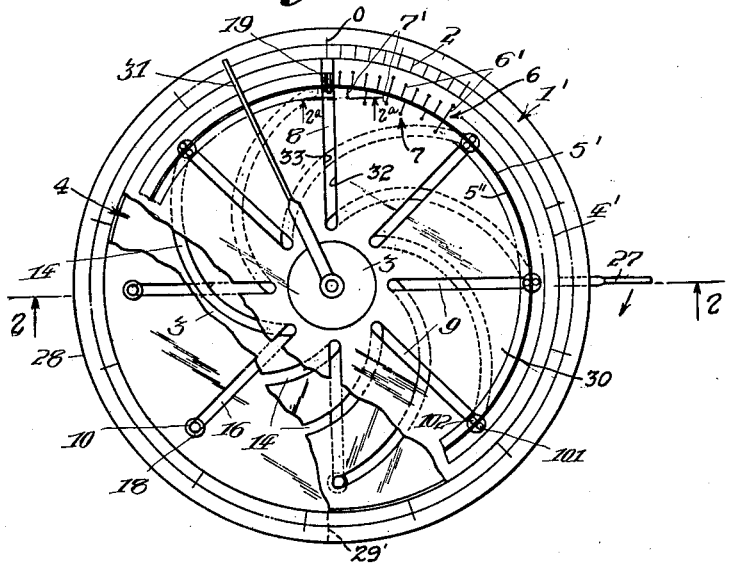
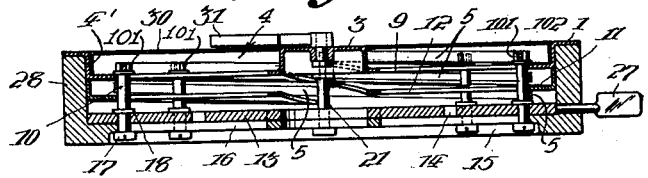
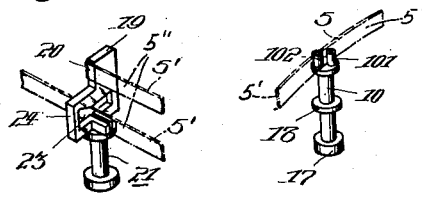
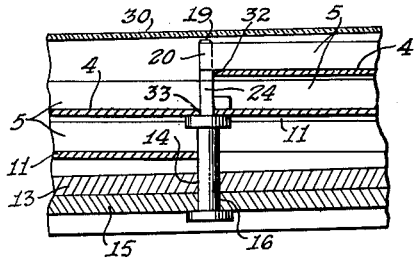
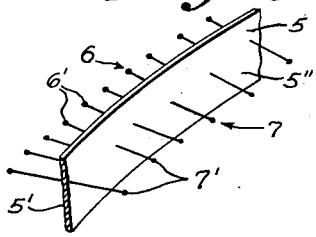
INVENTOR.
SHUNYA SUZUKI
BY
ATTORNEY

INVENTOR.
SHUNYA SUZUKI
BY
ATTORNEY

United States Patent Office 3,084,660
Patented Apr. 9, 1963

3,084,660
METERS AND LIKE INSTRUMENTS WITH
VARIABLE SCALES
Shunya Suzuki, c/o Toshiji Suzuki, 2511 Kichijoji,
Musashino-shi, Japan
Filed Jan. 6, 1959, Ser. No. 785,195
Claims priority, application Japan Jan. 9, 1958
2 Claims. (Cl. 116—129)

This invention relates to a flexible scale band which is caused to contract or expand to change at an optional rate in relation to a fixed standard scale. Its principle lies in varying the radius of a circular band, which is made of a material with a high elastic limit, without changing the distance between the graduations on the band. One of the objects of this invention is that the units of graduation of a meter may be varied freely since the rate of change of the graduations is optional. Another object is that it is possible to make optional conversions by the readings of the graduations on the movable scale in relation to that of the standard scale. A further object of this invention is that by moving the graduations of the movable band is concentric relation with the fixed standard scale, it is possible to easily and rapidly change the unit of graduation of the above meter or likewise the conversion values of the graduations on the scale.

In the accompanying drawings, FIG. 1 to FIG. 9 show a meter of an embodiment of this invention;

FIGURE 1 is an elevational view of the meter with parts broken away;

FIGURE 2 shows a cross-section on the center axis of the meter, taken on the lines 2—2 of FIGURE 1;

FIGURE 2a is a sectional view taken on line 2a—2a of FIGURE 1;

FIGURE 7 is an enlarged perspective view of the guide of the original end of the flexible scale band;

FIGURE 8 is an enlarged perspective view of a guide pin for the scale band; and FIG. 9 is an enlarged fragmentary perspective view of the flexible scale band.

Figure 3:
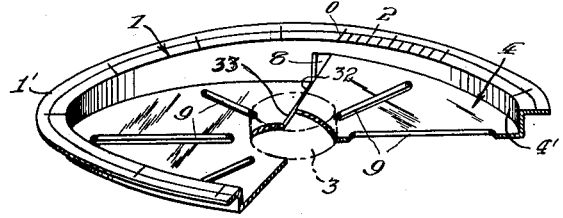
FIGURE 3 is a perspective view of an outer disc with parts broken away which forms a part of the invention.
Figure 4:
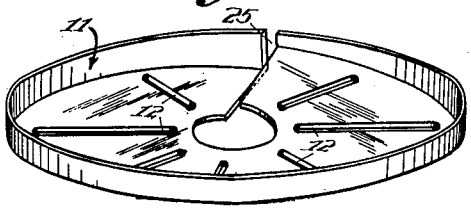
FIGURE 4 is a perspective view of an auxiliary disc to receive the free end of a movable flexible scale band.

In the embodiment shown in FIG. 1, a gradual declining recess 4 starting at edge 32 and terminating at 33, as clearly shown in FIGURE 3 is formed between the inner edge 4' of the standard fixed scale 2 mounted on a flange portion 1' of the outer disc 1 and the hub portion 3 in the center of said outer flange 1'. A thin flexible circular band 5 which is a metal strip with a high elastic limit and high thermal coefficient is located within said recess 4 close to inner edge 4'. On outer and inner faces 5'—5'' of the band 5 many pieces of fine wires 6'—7' are fitted for the graduations. In this case, the outer peripheral scale 6, as seen in FIGURE 1, are made to be opposite the graduations of the fixed standard scale 2 on the flange portion 1' of outer disc 1 and with the graduations in agreement with each other, and it is preferable that the inner peripheral scale 7 be graduated so that the point that corresponds to the scale value of 10 of the outer peripheral scale 6 is made to be equal to a value of 3 to 3.3 or 5 on the inner peripheral scale 7.

Starting at line 32, which is a line connecting the zero point of the standard scale 2 with the center of the outer disc 1, the recess 4 of the outer disc 1 gradually starts to decline and by the time it reaches the starting line 33 it is lower than the starting line 32 by a height equal to the width of the movable band 5, and between the two edges 32 and 33 a cutaway gap 8 of a constant width is formed to allow movable band 5 to pass therebetween.

In the recess 4, starting at the cutaway gap 8, there are provided a plurality of narrow straight radial slots 9 of equal angles apart, and it is preferable that the length of these slots 9 be made of a length in which the distance from the outer tips of the slots 9 to the center of the outer disc 1 is slightly greater than three times the distance from the inner tips of the slots 9 to the center of said outer disc 1. In each of the slots 9 a guide plug 10 is slidably mounted therein for guiding the flexible scale band 5, and this guide plug 10 is provided with two small pin-like projections 101 and 102, see FIG. 8 for clasping the scale band 5. The movable scale band 5 moves by sliding between these two small pin-like projections 101 and 102.

The bottom part of the above guide plug 10 extends down through outer disc 1, passing through the straight radial slot 12 provided in the auxiliary disc 11 and the curved radial slot 14 of rotating disc 13 and held to the base 15 of the meter case with a flange 17 affixed at the bottom of plug 10 after passing through the straight radial slot 16 provided in base 15. Another flange 18 is provided on the plug 10 which rests on the roating disc 13 for support. Hence, when the above rotating disc 13 is rotated, it is possible to cause each of the guide plugs 10 to move along in the slot 16 of the base 15. On the other hand, at the cutaway gap 8 of the recess 4 of the outer disc 1 a guide element 19 for the zero point 20 of the movable scale band is provided with the bent portion affixed thereto. This guide element 19 of the zero point is made in one body with the guide element 24 which receives the other free end of the band 5. This guide element 24, being provided with an opening 23 through which the wire pieces affixed to indicate the graduations on scales 6 and 7, as mentioned above, may pass, maintains the face of band 5 perpendicularly to the cutaway gap 8 of the outer disc 1 and the cutaway gap 25 of the auxiliary disc 11 and guides the band 5 from the above opening 23 through the cutaway portion of the auxiliary disc 11 into the rear side of said disc 11. The outer diameter of the auxiliary disc 11 and the diameter of its central hole are equal to the outer diameter of the recess 4 of the outer disc 1 and the diameter of its hole, respectively. Moreover, its surface is sloped in a similar fashion as that of the recess 4. And it is further provided with a cutaway gap 25 of the same width and phase as the cutaway gap 8 of the above recess 4. The difference between the height of the steps of the cutaway gap is also similar to the difference between the height of the steps of the cutaway gap 8 of the outer disc. Furthermore, the auxiliary disc is provided with straight radial slots 12 of similar length, width and phase as that of the outer disc 1.

Figure 5:
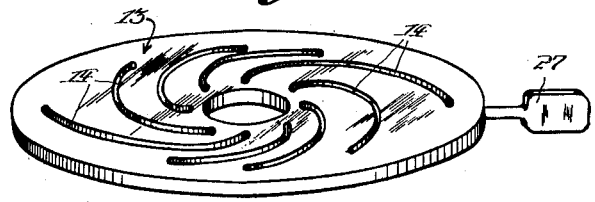
FIGURE 5 is a perspective view of the rotating disc.
Figure 6:
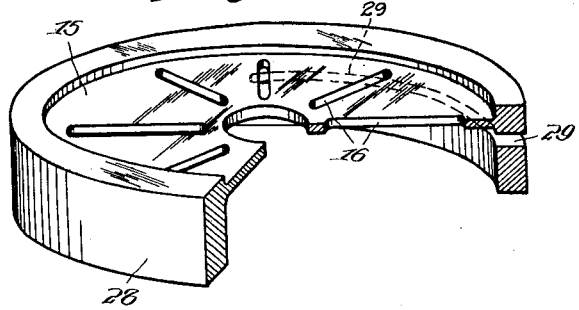
FIGURE 6 is a perspective view of the meter case showing its reverse side.

Next, a rotating disc 13 made of a comparatively thick metal plate of an outside diameter and inside hole diameter equal to the auxiliary disc 11 is provided as shown in FIG. 5. This rotating disc 13 has a plurality of curved slots 14 radially disposed coresponding in number with slots 9 or 12 of the outer disc or auxiliary disc and the respective distances of their inner and outer ends from the center of the rotating disc are equal to those of the radial slots 9 or 12 of the above-mentioned outer disc 1 or auxiliary disc 11. This rotating disc 13 is provided with a handle 27 on its outer edge for the purpose of rotating said rotating disc relatively to auxiliary disc 11.

The base 15 is made of a thick metal plate, and its outside diameter is equal to the outer diameter of the outer disc 1 with its inside diameter equivalent to the inside diameter of the recess 4. In this base 15, there are provided a plurality of straight radial slots 16 of identical dimensions as those of the above auxiliary disc 11 and with the same phase as the cutaway gap 25. As shown in FIG. 2, the foregoing auxiliary disc 11 is fitted into the inside of the cylindrical wall 28 of the meter case with the recess 4 of the outer disc 1 superimposed thereabove and the circumferential edge of the disc 1 resting on the top edge of the cylindrical wall 28. The auxiliary disc 11 is fixed to this cylindrical wall 28, and the rotating disc 13 rotates as described above by means of a handle 27, which has a guide slot 29 provided in the cylindrical edge 28. The length of this guide slot 29 corresponds to the length of the curved radial slots of the rotating disc 13. In the embodiment illustrated the limit of the moved angle is about 90°.

Also, the depth of the recess 4 of the outer disc 1 is made slightly deeper than the height of the movable scale band 5, and to prevent the band 5 from slipping upward and out the recess 4 is covered with a transparent cover 30. In the center of the central hub 3 of the outer disc 1 a rotatable pointer 31 is provided.

In using the dial of this invention, first when the projecting pieces of wires indicating the graduation on the movable scale band are caused to be in agreement with the graduations of the fixed standard scale 2 as shown in FIG. 1, the numerical values on the standard scale and the outer peripheral scale 6 will be identical when the pointer 31 is moved. When the rotating disc 13 is rotated clockwise in FIG. 1 by moving the handle 27, the intersecting points of the curved slots 14 of the rotating disc 13 and the straight slots 16 of the base 15 of the meter case will move towards the center along the slots 16, thus making possible to move each of the guide plugs 10 of the movable scale band 5 and the guide element 19, which are both located at the intersecting points, towards the center along the straight radial slots 9 and the cutaway gap 8. In this instance, the guide plugs 10 and guide element 19 are at all times located on the same circumference and an equal distance from the center. Hence, the movable scale band 5, which is guided by each of the guide plugs 10 and guide element 19, due to its being made of a material such as steel with high elastic limits, can be made to increase or decrease its radius while maintaining almost perfectly its circular shape.

As the radius of the movable scale band decreases, the length of the circumference of the movable scale band 5 becomes shorter and with the zero point 20 where the graduations begin being fixed to the guide element 19, the end of the scale band 5 longer than the circumference becomes left over. This excess portion, however, goes into the back of outer disc 1 the edges 32 and 33 of the cutaway gap 8 provided in recess 4 and advances between the rear surface of outer disc 1 and the front surface of auxiliary disc 11. In this instance, the scales 6 and 7 passes through the opening 23 of the guide element 19 located at the zero point and are guided along by the guide element 24. The outer end of the band 5 can advance still further and pass through the cutaway gap 25 of the auxiliary disc and into the rear side of it.

Now, as the radius of the movable scale band 5 is made smaller by moving the handle 27, since the zero point 20 of the scale band 5 merely moves towards the center hub 3 along the cutaway gap 8 without moving to the left or right, the graduating wires 6' on the outer peripheral scale 6 of the movable scale band 5 located opposite the standard scale move to positions where the wires gradually get smaller. In the embodiment illustrated in FIGURE 1, for example, when the radius of the movable band 5 contracts to a radius equivalent to 3/10 of the original radius, the 10th graduation of the outer peripheral scale 6 of the movable scale band 5 which was opposite the 10th graduation of the standard scale 2 becomes graduation 3. Therefore, it is possible to change the units of graduation or perform conversions between the two scales in accordance with the relative position that the movable scale band 5 is in relation to the fixed standard scale 2. Also, adaptations can be made to weighing meters where either the fixed scale 2 or the movable scale band 5 is made to indicate prices, and thereby making it possible to directly read off the prices for the different weights of any merchandise as may be desired. Moreover, with the inner peripheral scale 7 graduated differently from the above outer peripheral scale 6, by using the different combinations of the fixed standard scale 2 and the peripheral scales 6 and 7 of the movable scale band 5, various conversions are possible with the numerical values indicated on the face of the dial, not shown.

Although certain embodiments of the invention have been shown and described for purposes of illustration, it is to be understood that the invention may be applied to various uses and that changes and modifications may be made therein as will be apparent to a person skilled in the art.

I claim:

1. Meters and like instruments comprising, in combination, an outer disc with a fixed circular scale in its circumference, said outer disc including a stepped gap and a plurality of radial slots, a flexible scale band provided with two ends being guided by a plurality of guide plugs, a guide element provided with an opening, one end of said scale band being fixed to said guide element, and the other end of said band being free to pass through said opening in said guide element, an auxiliary disc having similar radial slots and stepped gap as said outer disc and superimposed thereon, and a rotatable disc having a plurality of curved radial slots, said guide element being displaced along the stepped gap of said outer disc and auxiliary disc, and the plurality of guide plugs being displaced radially along the respective slots of the outer disc, auxiliary disc, and the rotatable disc.

2. Meters and like instruments according to claim 1 wherein the flexible scale band is made of a steel strip and graduated with many pieces of fine wires fitted on the face thereof.

References Cited in the file of this patent

UNITED STATES PATENTS

| | | |
|---|---|---|
| 1,062,740 | Sharpe | May 27, 1913 |
| 2,653,565 | Adams | Sept. 29, 1953 |

FOREIGN PATENTS

| | | |
|---|---|---|
| 282,253 | Great Britain | Dec. 22, 1927 |